United States Patent
Wiechers et al.

(10) Patent No.: US 11,809,182 B2
(45) Date of Patent: Nov. 7, 2023

(54) AVERTING A DANGER

(71) Applicants: Ralph Wiechers, Mayschoß (DE); Christian Ibach, Bonn (DE)

(72) Inventors: Ralph Wiechers, Mayschoß (DE); Christian Ibach, Bonn (DE)

(73) Assignee: Deutsche Post AG, Bonn (DE)

( * ) Notice: Subject to any disclaimer, the term of this patent is extended or adjusted under 35 U.S.C. 154(b) by 241 days.

(21) Appl. No.: 15/787,355

(22) Filed: Oct. 18, 2017

(65) Prior Publication Data
US 2018/0113452 A1    Apr. 26, 2018

(30) Foreign Application Priority Data
Oct. 20, 2016    (DE) ............ 10 2016 120 058.1

(51) Int. Cl.
| | |
|---|---|
| *G05D 1/00* | (2006.01) |
| *G08B 15/00* | (2006.01) |
| *G08B 13/00* | (2006.01) |
| *B60R 25/01* | (2013.01) |
| *B60R 25/30* | (2013.01) |

(Continued)

(52) U.S. Cl.
CPC ........... *G05D 1/0055* (2013.01); *B60R 25/01* (2013.01); *B60R 25/30* (2013.01); *F41H 7/005* (2013.01); *F41H 9/00* (2013.01); *F41H 13/00* (2013.01); *F41H 13/0006* (2013.01); *F41H 13/0012* (2013.01); *F41H 13/0018* (2013.01); *F41H 13/0081* (2013.01); *F41H 13/0087* (2013.01); *G05D 1/0088* (2013.01); *G08B 13/00* (2013.01); *G08B 15/00* (2013.01); *G08B 13/19647* (2013.01)

(58) Field of Classification Search
CPC .... G05D 1/0055; G05D 1/0088; G08B 13/00; G08B 15/00; G08B 13/19647; F41H 13/0087; F41H 13/0081; F41H 13/0018; F41H 13/0012; F41H 13/0006; F41H 13/00; F41H 9/00; F41H 7/005; B60R 25/30; B60R 25/01; H04N 7/18; G08C 17/02; G06Q 50/28; G01D 21/02; B63G 7/02
See application file for complete search history.

(56) References Cited

U.S. PATENT DOCUMENTS

| | | | |
|---|---|---|---|
| 6,439,162 B1 * | 8/2002 | van den Berg | A01K 1/0103 119/174 |
| 9,561,842 B1 * | 2/2017 | Camacho-Cardoza | B63G 7/06 |

(Continued)

FOREIGN PATENT DOCUMENTS

| | | |
|---|---|---|
| CN | 1125671 A | 7/1996 |
| CN | 1417754 A | 5/2003 |

(Continued)

*Primary Examiner* — Ian Jen
(74) *Attorney, Agent, or Firm* — Reinhart Boerner Van Deuren P.C.

(57) ABSTRACT

Disclosed herein are embodiments of a method for averting a danger. The method is performed by a control apparatus for an unmanned vehicle, and the method involves obtaining a plurality of pieces of sensor information. At least partially depending on the obtained pieces of sensor information it is determined whether a danger exists. If it is determined that a danger exists, then at least one averting measure for averting the danger is determined, and the at least one averting measure is performed or caused to be performed.

21 Claims, 4 Drawing Sheets

(51) Int. Cl.
*F41H 7/00* (2006.01)
*F41H 9/00* (2006.01)
*F41H 13/00* (2006.01)
*G08B 13/196* (2006.01)

(56) References Cited

U.S. PATENT DOCUMENTS

| | | | |
|---|---|---|---|
| 2006/0038678 A1* | 2/2006 | Avneri | B61B 3/02 |
| | | | 340/541 |
| 2008/0100706 A1 | 5/2008 | Breed | |
| 2010/0193626 A1* | 8/2010 | Goossen | B64C 37/00 |
| | | | 244/2 |
| 2013/0125741 A1* | 5/2013 | Lambertus | B63G 7/02 |
| | | | 89/1.13 |
| 2015/0205298 A1 | 7/2015 | Stoschek et al. | |
| 2015/0289122 A1* | 10/2015 | Friesen | H04W 4/029 |
| | | | 455/404.2 |
| 2017/0095926 A1* | 4/2017 | Saboo | G05D 1/0217 |
| 2017/0186248 A1* | 6/2017 | Fournier | G05D 1/0088 |

FOREIGN PATENT DOCUMENTS

| | | |
|---|---|---|
| CN | 1421826 A | 6/2003 |
| CN | 2570118 Y | 9/2003 |
| CN | 101132965 A | 2/2008 |
| CN | 101488266 A | 7/2009 |
| CN | 102390351 A | 3/2012 |
| CN | 103268119 A | 8/2013 |
| CN | 103507754 A | 1/2014 |
| CN | 103914076 A | 7/2014 |
| CN | 204492471 U | 7/2015 |
| CN | 205223907 U | 5/2016 |
| CN | 205563268 U | 9/2016 |
| DE | 10 2005 061 237 A1 | 6/2007 |
| EP | 1 496 484 A1 | 1/2005 |
| EP | 2 423 893 A1 | 2/2012 |
| GB | 2 166 225 A | 4/1986 |
| GB | 2166225 A | 4/1986 |
| JP | 2017-124809 A | 7/2017 |
| WO | WO 00/70941 A1 | 11/2000 |
| WO | WO 03/104027 A2 | 12/2003 |
| WO | WO 2004/003680 A2 | 1/2004 |
| WO | WO 2009/147663 A2 | 12/2009 |

* cited by examiner

AVERTING A DANGER

CROSS-REFERENCE TO RELATED PATENT APPLICATION

This patent application claims priority to German Application No. 10 2016 120 058.1, filed Oct. 20, 2016, the entire teachings and disclosure of which are incorporated herein by reference thereto.

FIELD

Exemplary embodiments of the invention relate to a method for averting a danger and/or for prompting the averting of a danger. A control apparatus and a computer program are further disclosed.

BACKGROUND

The prior art discloses, inter alia, unmanned vehicles having a receiving compartment or a plurality of receiving compartments for transporting one or more shipments. These unmanned vehicles may be exposed to different dangers during transport of the shipment, for example possible theft of the shipment.

SUMMARY OF SOME EXEMPLARY EMBODIMENTS OF THE INVENTION

The object of the present invention is therefore, inter alia, to overcome these problems.

The invention discloses a method for averting a danger and/or for prompting the averting of a danger, wherein the method is performed by a control apparatus for an unmanned vehicle, and wherein the method comprises the following:
  obtaining a plurality of pieces of sensor information;
  determining, at least partially depending on the obtained pieces of sensor information, whether a danger exists;
  determining, if it is determined that a danger exists, at least one averting measure for averting the danger;
  performing and/or causing the performing of the at least one averting measure.

The invention further discloses a control apparatus for an unmanned vehicle, wherein the control apparatus comprises means configured to perform the method according to the invention or respective means for performing the steps of the method according to the invention.

In this case, different steps can be optionally performed by different means.

The means of the control apparatus according to the invention may comprise hardware and/or software components. The means may comprise, for example, at least one memory containing program instructions of a computer program (for example of the computer program according to the invention) and at least one processor configured to execute program instructions from the at least one memory. Accordingly, a control apparatus comprising at least one processor and at least one memory containing program instructions is also intended to be understood as having been disclosed according to the invention, wherein the at least one memory and the program instructions are configured, together with the at least one processor, to prompt the control apparatus to perform the method according to the invention.

Alternatively or additionally, the means may further comprise one or more communication interfaces (for example one or more wireless and/or wired network adapters) and/or one or more sensors. It goes without saying that the control apparatus may also comprise other means which have not been listed.

The control apparatus according to the invention is, for example, a control apparatus for controlling an unmanned vehicle. Alternatively or additionally, the control apparatus according to the invention is used, for example, to avert a danger and/or to prompt the averting of a danger.

The invention further discloses a computer program, wherein the computer program comprises program instructions which are configured, when executed by at least one processor, to prompt an apparatus (for example the control apparatus according to the invention) to perform the method according to the invention.

The computer program according to the invention is included and/or stored on a computer-readable storage medium, for example. A computer-readable storage medium is intended to be understood as meaning, for example, a physical and/or tangible storage medium.

The features of the method according to the invention, the control apparatus according to the invention and the computer program according to the invention are described below, partially by way of example.

An unmanned vehicle is intended to be understood as meaning, for example, an aircraft, a watercraft and/or a land vehicle, for example an aircraft, a watercraft and/or a land vehicle which comprises means for receiving and/or transporting one or more shipments and can at least partially move in an autonomous manner. For example, the unmanned vehicle comprises at least one receiving compartment which is closable by means of a door and/or a flap and is intended to receive and transport one or more shipments. It goes without saying that the unmanned vehicle may also have a plurality of receiving compartments which are closable by means of a door and/or a flap and are intended to receive and transport one or more shipments. A shipment is, for example, a package, a piece good, a parcel shipment (for example a parcel) and/or a mail shipment (for example a letter). The door and/or flap closes, for example, a housing and/or body opening of the unmanned vehicle, through which opening a receiving compartment of the vehicle is accessible. An unmanned vehicle is not intended to transport persons (for example neither to transport a driver nor to transport passengers), for example.

One piece of sensor information represents, for example, an environment property captured by a sensor at the position of the sensor (for example a value of a physical or chemical variable capturable at the position of the sensor). The pieces of sensor information represent, for example, environment properties captured by different sensors (for example by at least two different sensors).

For example, the pieces of sensor information may be at least partially obtained by capturing one or more environment properties by means of one or more sensors of the control apparatus. Alternatively or additionally, the pieces of sensor information may also be at least partially obtained by receiving the pieces of sensor information by means of a wireless and/or wired communication interface of the control apparatus. For example, the pieces of sensor information may be at least partially received from one or more sensors which are not part of the control apparatus by means of such a wireless and/or wired communication interface.

A danger is intended to be understood as meaning, for example, that there is a particular probability (for example more than 50%, preferably more than 75%, particularly preferably more than 90%) of damage (for example functional destruction and/or functional impairment) and/or unauthorized use (for example theft) of the unmanned vehicle and/or of a shipment transported by the unmanned vehicle. The determining, at least partially depending on the obtained pieces of sensor information, whether a danger exists accordingly reveals, for example, that a danger exists if the obtained pieces of sensor information reveal that there is a particular probability of such damage and/or unauthorized use. For example, it is possible to predetermine for particular pieces of sensor information that, if said pieces of information are obtained, there is a particular probability of damage and/or unauthorized use.

Danger information, for example, is obtained as the result of determining whether a danger exists. As disclosed in detail below, the danger information is indicative of the location of the danger, the time of the danger and/or the type of danger, for example.

An averting measure is, for example, an action and/or a sequence of a plurality of actions.

A danger can be averted, for example, by means of an averting measure which reduces the probability of damage and/or unauthorized use of the unmanned vehicle and/or of a shipment transported by the unmanned vehicle. Accordingly, the at least one averting measure for averting the danger can be determined in such a manner that it reduces the probability of such damage and/or unauthorized use. For example, it is possible to predetermine for particular averting measures that the latter reduce the probability of damage and/or unauthorized use (for example for one or more types of danger).

A danger may be present, for example, if there is a particular probability (for example more than 50%, preferably more than 75%, particularly preferably more than 90%) of theft of a shipment transported by the unmanned vehicle. The probability of such theft may be reduced, for example, by means of a signal-based averting measure in the form of video and/or image monitoring of the unmanned vehicle. For example, passers-by could become aware of the possible theft as a result of such a signal-based averting measure, with the result that the thief desists from his intention.

The causing of the performing of the averting measure is intended to be understood as meaning, for example, that the control apparatus controls the unmanned vehicle and/or means of the unmanned vehicle in such a manner that the unmanned vehicle and/or the means of the unmanned vehicle perform(s) the averting measure.

The present invention therefore enables a flexible and situation-dependent response to a danger in order to be able to avert the danger.

In exemplary embodiments of the invention, the pieces of sensor information originate from one or more sensors (for example from a plurality of different sensors). For example, the pieces of sensor information are intended to be understood as originating from one or more sensors if the pieces of sensor information are provided by these sensors and/or represent environment properties captured by these sensors.

For example, the pieces of sensor information originate from one or more of the following sensors: a temperature sensor (for example a thermometer, a thermocouple and/or a temperature-sensitive resistor), a pressure sensor, a brightness sensor, a motion sensor (for example a motion detector), an acoustic sensor (for example a microphone and/or a noise sensor), an ultrasonic sensor, an optical sensor, an infrared sensor, a light sensor (for example a brightness sensor, a photodiode and/or a photoresistor), an image sensor (for example an image camera, a CMOS sensor and/or a CCD sensor), a video sensor (for example a video camera, a CMOS sensor and/or a CCD sensor), a chemical sensor (for example a gas sensor), a glass breakage sensor, a motion sensor, a radio sensor (for example a wireless communication interface and/or a WLAN, NFC and/or Bluetooth sensor), a position sensor (for example a GPS sensor), a door and/or window opening sensor (for example a contact sensor), a fingerprint sensor and/or an acceleration sensor.

In exemplary embodiments of the invention, the determining whether a danger exists is carried out according to one or more predetermined rules and/or according to a pattern recognition algorithm and/or according to a machine learning algorithm.

If particular pieces of sensor information are obtained, the predetermined rules may predetermine that a danger exists, for example. The rules may further predetermine what type of danger it is if it is determined that a danger exists. For example, the rules may predetermine that a danger exists if the pieces of sensor information reveal that the unmanned vehicle is no longer moving even though the drive of the unmanned vehicle is running, and/or if a door opening sensor indicates that the door of the receiving compartment has been opened or the door has been shaken or hit without a door opening authorization code having been previously obtained (for example by means of an input on a user interface of the control apparatus and/or of the unmanned vehicle).

The pattern recognition may be static pattern recognition, for example. For example, a probability of a danger existing is determined in this case for the obtained pieces of sensor information. For example, a probability of no danger existing is further determined for the obtained pieces of sensor information. For example, the determining whether a danger exists reveals that a danger exists only when the probability of a danger existing is higher than the probability of no danger existing. In addition, the probabilities of different types of dangers may be determined, for example, in order to be able to determine the type of danger. Pattern recognition algorithms are at least partially based, for example, on an artificial neural network, a Support Vector Machine, a cluster analysis or a combination of a plurality (for example all) of these techniques.

The machine learning can be carried out, for example, in the form of supervised machine learning. In the case of supervised machine learning, the result of determining whether a danger exists is monitored in a learning phase, for example by comparing the obtained pieces of sensor information with pieces of reference sensor information, and the algorithm is adapted in order to minimize a deviation of the result from a reference result assigned to pieces of reference sensor information corresponding to the obtained pieces of sensor information. For example, the reference results predetermine the result of determining whether a danger exists and/or what type of danger it is for particular pieces of reference sensor information. The pieces of reference sensor information and reference results may originate from one or more other control apparatuses, for example, or may be obtained by means of tests. Machine learning algorithms may likewise be at least partially based on an artificial neural network, a Support Vector Machine, a cluster analysis or a combination of a plurality (for example all) of these techniques.

In exemplary embodiments of the invention, the determining of the at least one averting measure is carried out according to one or more predetermined rules and/or according to a pattern recognition algorithm and/or according to a machine learning algorithm.

The predetermined rules may predetermine, for example, which averting measure under what conditions is intended to be determined for the purpose of averting the danger.

For example, the determining of the at least one averting measure for averting the danger is carried out at least partially depending on the type of danger. In this example, the predetermined rules may predetermine which averting measure for which type of danger is intended to be determined for the purpose of averting the danger. The type of danger is at least partially obtained, for example, as the result of determining whether a danger exists and/or is determined if it is determined that a danger exists.

For example, the determining of the at least one averting measure for averting the danger is carried out by selecting the at least one averting measure for averting the danger from a plurality of averting measures. The plurality of averting measures are, for example, all averting measures which are performable by the unmanned vehicle and/or means of the unmanned vehicle and/or all averting measures in a particular group of averting measures which are performable by the unmanned vehicle and/or means of the unmanned vehicle.

In this example, the selecting can be carried out according to the predetermined rules which predetermine, for example, which averting measure is intended to be selected for which type of danger. Alternatively or additionally, these rules predetermine, for example, whether and under what conditions a particular averting measure is intended to be selected for the purpose of averting a particular type of danger. For example, the rules predetermine a sequence in which the averting measures are intended to be selected. For example, the sequence provides for only lenient averting measures (for example averting measures from the group of signal-based and/or movement-based averting measures) to be intended to be selected if it is determined for the first time that a danger exists. If it is determined that the danger still exists after these lenient averting measures have been performed, less lenient averting measures (for example averting measures from the group of averting measures which act upon contact with and/or at a distance from the unmanned vehicle or a part of the unmanned vehicle) are intended to be selected, for example.

It goes without saying that the at least one averting measure for averting the danger can be alternatively or additionally selected from the plurality of averting measures according to a pattern recognition algorithm and/or according to a machine learning algorithm. Within the scope of pattern recognition, each averting measure of the plurality of averting measures can be weighted on the basis of its suitability (for example effectiveness) for averting the danger, for example. For example, the weighting corresponds to an expected effectiveness and/or the probability with which the respective averting measure reduces the probability of damage and/or unauthorized use of the unmanned vehicle and/or of a shipment transported by the unmanned vehicle. Furthermore, a proportionality consideration (for example personal damage, social damage, material damage) and/or possible collateral damage can also be taken into account in the weighting. For example, of two averting measures which both equally reduce the probability of damage and/or unauthorized use of the unmanned vehicle and/or of a shipment transported by the unmanned vehicle, that averting measure which probably causes less collateral damage can be given a higher weighting. For example, at least that averting measure which has the highest weighting is selected for the purpose of averting the danger.

It goes without saying that a plurality or all of the averting measures of the plurality of averting measures can also be selected. For example, it may be predetermined that all averting measures or all averting measures with a particular minimum weighting are prompted.

In exemplary embodiments of the invention, the at least one averting measure belongs to one of the following groups of averting measures:
signal-based averting measures,
movement-based averting measures,
averting measures which act upon contact with the unmanned vehicle or a part of the unmanned vehicle,
averting measures which act at a distance from the unmanned vehicle or a part of the unmanned vehicle, and/or
averting measures which fix the unmanned vehicle or a part of the unmanned vehicle.

As disclosed above, an averting measure is intended to be understood as meaning an action and/or a sequence of actions.

A signal-based averting measure comprises, for example, the following action:
outputting a signal, in particular an optical and/or acoustic and/or olfactory signal.

An optical signal is, for example, an optically perceptible signal such as a light signal and/or an image signal, an acoustic signal is, for example, an acoustically perceptible signal such as a noise signal and/or a voice signal, and an olfactory signal is, for example, an olfactorily perceptible signal such as an odor signal. This makes it possible, for example, to arouse attention and/or to produce a situation which is unpleasant for a possible attacker (for example a possible vandal and/or thief) in order to dissuade the possible attacker from his intention (for example vandalism and/or theft).

For example, further averting measures may be initially threatened by means of a voice signal. In this case, averting measures in the form of a bluff which cannot be performed by the unmanned vehicle at all may also possibly be threatened in order to dissuade the possible attacker from his intention. It is also possible for an operator in a monitoring center to attempt to make contact with the possible attacker via such signal means if the control apparatus and/or the unmanned vehicle is/are communicatively connected to a monitoring center (for example to a server of the monitoring center). Furthermore, if the possible attacker can be identified (for example on the basis of one or more of the pieces of sensor information), he can also be personally addressed in order to deter him.

Pieces of sensor information which can be used for such identification are, for example, image and/or video recordings (for example for facial recognition and/or a facial search), pieces of fingerprint information (for example fingerprints of a possible attacker can be captured using (a) fingerprint sensor(s) arranged on a door and/or a flap of a receiving compartment and can be used for identification) and/or pieces of device information such as an identifier (for example a unique identifier, a MAC address, a network name, a so-called International Mobile Subscriber Identity, etc.) of one or more mobile devices (for example one or more mobile telephones) in the environment. The identification can be performed, for example, by the control apparatus. Alternatively or additionally, the identification can also be performed by an apparatus which differs from the control apparatus (for example a server such as a server of a monitoring center and/or a police server) and to which the control apparatus and/or the unmanned vehicle is/are communicatively connected.

For example, the unmanned vehicle comprises signal means configured to output a signal. Examples of optical signal means configured to output an optical signal are a lamp, a warning lamp, a flashing light, a strobe light and/or a screen; examples of acoustic signal means configured to output an acoustic signal are a siren, a loudspeaker and/or a sound cannon; examples of olfactory signal means configured to output an olfactory signal are an electric vaporizer and/or spraying systems (for example spraying systems operated by gas pressure).

A movement-based averting measure may comprise, for example, one or more of the following actions:
changing the movement speed of the unmanned vehicle, and/or
changing the movement direction of the unmanned vehicle.

The movement speed can be changed, for example, in the form of an acceleration and/or deceleration of the unmanned vehicle. For example, the control apparatus is configured to control a drive and/or a brake system of the unmanned vehicle to change the movement speed of the unmanned vehicle.

The changing of the movement direction of the unmanned vehicle is intended to be understood as meaning, for example, that the unmanned vehicle deviates from a predetermined route (for example a transport route and/or a navigation route and/or an optimum route). For example, the control apparatus is configured to control a steering system of the unmanned vehicle to change the movement direction of the unmanned vehicle.

The movement speed and/or the movement direction of the unmanned vehicle can be changed, for example, in such a manner that the unmanned vehicle performs one or more evasive maneuvers and/or evasive movements. Such an evasive maneuver and/or such an evasive movement can be predetermined, for example, in the form of acceleration and deceleration profiles and/or steering profiles. The acceleration and deceleration profiles and/or steering profiles are selected, for example, in such a manner that the evasive maneuver and/or the evasive movement is/are predictable only with difficulty, with the result that it is difficult for a possible attacker to overtake and/or touch the unmanned vehicle (for example if the type of danger is vandalism and/or possible spying-out and/or possible theft).

An averting measure which acts upon contact with the unmanned vehicle or a part of the unmanned vehicle comprises, for example, one or more of the following actions:
changing the surface or a part of the surface of the unmanned vehicle,
applying an electrical voltage to the surface or a part of the surface of the unmanned vehicle, and/or
wetting the surface or a part of the surface of the unmanned vehicle with a liquid.

The changing of the surface or a part of the surface of the unmanned vehicle is intended to be understood as meaning, for example, that spikes and/or hooks arranged in and/or on the surface or a part of the surface of the unmanned vehicle are extended.

An electrical voltage can be applied to the surface or a part of the surface of the unmanned vehicle, for example, in the form of voltage pulses which are produced by an electrical voltage generator of the unmanned vehicle. The maximum voltage of such a voltage pulse is in a range between 2 kV and 10 kV, for example. The duration of such a voltage pulse is in a range between 5 µs and 10 ms, for example. The current intensity during such a voltage pulse is restricted to a maximum of 15 A, for example. For example, the maximum voltage, duration and maximum current intensity of the voltage pulse are selected in such a manner that a person receives a (presumably) non-fatal electric shock if the person touches the surface or the part of the surface of the unmanned vehicle.

The liquid used to wet the surface or a part of the surface of the unmanned vehicle may be, for example, a marking liquid and/or a lubricating liquid which reduces the friction on the surface or the part of the surface of the unmanned vehicle. A marking liquid is, for example, artificial DNA (for example a liquid having synthetically produced oligonucleotides) and/or a paint (for example a paint which is difficult to wash off). A lubricating liquid is, for example, an oil and/or a soap solution. The liquid may be contained, for example, in a tank in the unmanned vehicle and may be dispensed through outlets on the surface or the part of the surface of the unmanned vehicle.

These averting measures which act upon contact with the unmanned vehicle or a part of the unmanned vehicle are advantageous, for example, in order to be able to make it difficult for a possible attacker (for example a vandal and/or thief) to touch and/or prevent a possible attacker from touching the unmanned vehicle and/or in order to be able to detect this.

An averting measure which acts at a distance from the unmanned vehicle or a part of the unmanned vehicle comprises, for example, one or more of the following actions:
casting a net,
triggering a distance electroshock weapon,
triggering a sound and/or radiation cannon, and/or
spraying a liquid and/or a gas.

The net may be cast, for example, in such a manner that a possible attacker is hit and hindered thereby, for example. The net is cast, for example, by a net gun of the unmanned vehicle.

The distance electroshock weapon, is, for example, a stun gun (for example a so-called taser). The distance electroshock weapon is triggered, for example, in such a manner that a possible attacker is hit thereby and one or more electrical voltage pulses are transmitted to the possible attacker. As disclosed above, the maximum voltage of such a voltage pulse is in a range between 2 kV and 10 kV, for example. The duration of such a voltage pulse is in a range between 5 µs and 10 ms, for example. The current intensity during such a voltage pulse is restricted to a maximum of 15 A, for example. For example, the maximum voltage, duration and maximum current intensity of the voltage pulses are selected in such a manner that they cause a (presumably) non-fatal electric shock in a person hit by the distance electroshock weapon.

A sound cannon is configured, for example, to output a noise with such a high sound pressure level when it is triggered that uncomfortableness and pain sensations are caused in a possible attacker. In this case, the uncomfortableness threshold can depend on the type and origin of the noise, and the pain threshold may be between 120 dB and 140 dB depending on the frequency composition of the noise. For example, the noise is output in such a manner that it (presumably) does not cause any lasting physical harm to a person who has been hit (for example a possible attacker).

A radiation cannon is intended to be understood as meaning, for example, the so-called Active Denial System (ADS). When triggered, such a radiation cannon may radiate, for example, strong and directed microwaves (for example at a frequency of 95 GHz) onto a possible attacker. The microwave beams may be directed onto possible attackers at a distance of up to more than 500 meters, for example using an antenna which has been accordingly configured. The energy of the microwave beams is selected, for example, in such a manner that the water molecules in the skin of the possible attacker heat up to approximately 55° C. within seconds and therefore cause intense irritation. For example, the microwave beams are selected in such a manner that they (presumably) do not cause any lasting physical harm to a person who has been hit (for example a possible attacker).

The liquid used for spraying is, for example, a marking liquid and/or a lubricating liquid; and the gas used for spraying is, for example, an irritant gas and/or tear gas. The liquid and/or the gas may be contained, for example, in a tank in the unmanned vehicle and may be sprayed by means of one or more nozzles.

An averting measure which fixes the unmanned vehicle or a part of the unmanned vehicle may comprise the following action, for example:

triggering a fixing mechanism.

Examples of such a fixing mechanism are means configured to anchor the unmanned vehicle in the ground and/or to chain the unmanned vehicle to an environment object (for example a lamppost, a tree or a bicycle). One example of such a means is a screwing device which is configured to screw one or more screws connected to the unmanned vehicle into the ground and/or one or more environment objects for the purpose of fixing the unmanned vehicle. Another example of such a means is a nailing device (for example a nail gun driven with compressed air) which is configured to drive (for example fire) one or more nails connected to the unmanned vehicle into the ground and/or one or more environment objects for the purpose of fixing the unmanned vehicle. Furthermore, it is also conceivable for an arresting hook, which is configured to open in order to interlock with one or more environment objects for the purpose of fixing the unmanned vehicle, to be such a means. Further examples of such means are, for example, an adhesive bonding device which is configured to adhesively bond the unmanned vehicle to the ground and/or one or more environment objects, and/or a type of automated shackle lock.

In exemplary embodiments of the invention, the method further comprises the following:

storing and/or prompting the storing of pieces of documentation information for documenting the danger and/or the averting of the danger.

The pieces of documentation information contain, for example, pieces of sensor information. For example, the pieces of documentation information are stored in a memory of the control apparatus.

In exemplary embodiments of the invention, the method further comprises the following:

obtaining further pieces of sensor information; and
determining, at least partially depending on the obtained further pieces of sensor information, whether the danger still exists.

For example, the further pieces of sensor information are obtained after causing the at least one averting measure. The success of the at least one averting measure can be determined on the basis of these further pieces of sensor information.

The determining, at least partially depending on the obtained further pieces of sensor information, whether the danger still exists is carried out, for example, according to the above-disclosed determining, at least partially depending on the obtained pieces of sensor information, whether a danger exists. If it is revealed that the danger no longer exists, stopping of the at least one averting measure is caused, for example. Otherwise, the at least one averting measure is continued and/or a further averting measure (for example a less lenient averting measure, as disclosed above) for averting the danger is determined.

Further advantageous exemplary embodiments of the invention can be gathered from the following detailed description of some exemplary embodiments of the present invention, in particular in conjunction with the figures. However, the figures accompanying the application are intended to be used only for the purpose of illustration but not for the purpose of determining the scope of protection of the invention. The accompanying drawings are not necessarily true to scale and are intended to only reflect the general concept of the present invention by way of example. In particular, features which are included in the figures are in no way intended to be considered a necessary part of the present invention.

DETAILED DESCRIPTION

Figure 1:
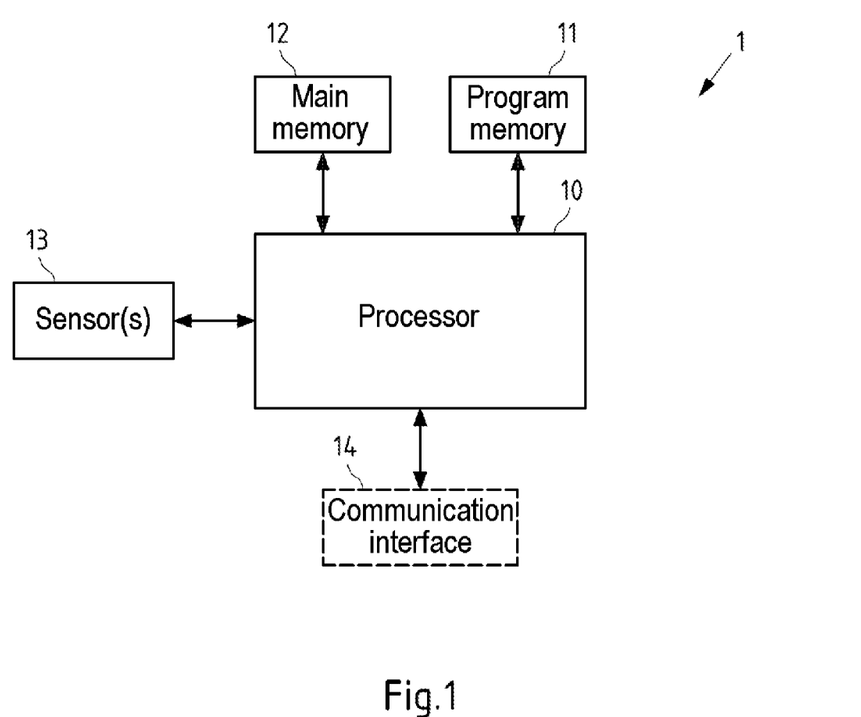
FIG. 1 shows a schematic illustration of an exemplary embodiment of a control apparatus according to the invention.

FIG. 1 is a schematic illustration of an exemplary embodiment of a control apparatus 1 according to the invention.

The control apparatus 1 comprises, for example, a processor 10 and, connected to the processor 10, a first memory as a program and data memory 11, a second memory as a main memory 12 and one or more sensors 13. Control apparatus 1 can further comprise an optional wireless communication interface 14.

A processor is intended to be understood as meaning, for example, a microprocessor, a micro-control unit, a microcontroller, a digital signal processor (DSP), an application-specific integrated circuit (ASIC) or a field programmable gate array (FPGA). It goes without saying that the control apparatus 1 may also comprise a plurality of processors 10.

Processor 10 executes program instructions, which are stored in program memory 11, and stores intermediate results or the like in main memory 12, for example. The program memory 11 contains, for example, program instructions of a computer program according to the invention which comprises program instructions which prompt the processor 10 to perform and/or control the method according to the invention (for example the method according to the flowchart 300 illustrated in FIG. 3) when the processor 10 executes these program instructions stored in program memory 11.

Program memory 11 further contains, for example, the operating system of the control apparatus 1, which operating system is at least partially loaded into main memory 12, when the control apparatus 1 is started, and is executed by the processor 10. In particular, at least one part of the core of the operating system is loaded into the main memory 12, when the control apparatus 1 is started, and is executed by processor 10.

One example of an operating system is a Windows, UNIX, Linux, Android, Apple iOS and/or MAC OS operating system. The operating system makes it possible, in particular, to use the control apparatus 1 for data processing. It manages, for example, operating means such as a main memory and a program memory, provides other computer programs with fundamental functions, inter alia by means of programming interfaces, and controls the execution of computer programs.

A program memory is, for example, a non-volatile memory such as a flash memory, a magnetic memory, an EEPROM memory (electrically erasable programmable read-only memory) and/or an optical memory. A main memory is, for example, a volatile or non-volatile memory, in particular a random access memory (RAM) such as a static RAM memory (SRAM), a dynamic RAM memory (DRAM), a ferroelectric RAM memory (FeRAM) and/or a magnetic RAM memory (MRAM).

Main memory 12 and program memory 11 may also be in the form of one memory. Alternatively, main memory 12 and/or program memory 11 may each be formed by a plurality of memories. Furthermore, main memory 12 and/or program memory 11 may also be part of the processor 10.

In addition, control apparatus 1 has one or more sensors 13. The sensors 13 are configured, for example, to capture an environment property (for example a measured value of a physical or chemical variable capturable at the position of the sensor). Furthermore, the sensors 13 are configured, for example, to provide pieces of sensor information which represent the environment properties captured by the sensors 13. These pieces of sensor information originate from the sensors 13 and can be processed further by the processor 10, for example.

The sensors 13 comprise, for example, one or more of the following sensors: a temperature sensor (for example a thermometer, a thermocouple and/or a temperature-sensitive resistor), a pressure sensor, a brightness sensor, a motion sensor (for example a motion detector), an acoustic sensor (for example a microphone and/or a noise sensor), an ultrasonic sensor, an optical sensor, an infrared sensor, a light sensor (for example a brightness sensor, a photodiode and/or a photoresistor), an image sensor (for example an image camera, a CMOS sensor and/or a CCD sensor), a video sensor (for example a video camera, a CMOS sensor and/or a CCD sensor), a chemical sensor (for example a gas sensor), a glass breakage sensor, a motion sensor, a radio sensor (for example a wireless communication interface and/or a WLAN, NFC and/or Bluetooth sensor), a position sensor (for example a GPS sensor), a door and/or window opening sensor (for example a contact sensor), and/or an acceleration sensor.

Alternatively or additionally, the sensors 13 are at least partially outside the control apparatus 1. In this case, the pieces of sensor information from the external sensors 13 can be received, for example, by the optional wireless communication interface 14 (or a further wired or wireless communication interface).

Processor 10 controls the optional wireless communication interface 14.

A wireless communication interface can receive, for example, pieces of information according to a wireless communication technology (via a wireless communication path) and can forward them to the processor and/or can receive pieces of information from the processor and can transmit them according to a wireless communication technology (via a wireless communication path).

One example of a wireless communication technology is a local radio network technology such as Radio Frequency Identification (RFID) and/or Near Field Communication (NFC) and/or Bluetooth (for example Bluetooth Version 2.1 and/or 4.0) and/or Wireless Local Area Network (WLAN). RFID and NFC are specified, for example, according to the ISO standards 18000, 11784/11785 and the ISO/IEC standard 14443-A and 15693. The Bluetooth specifications are currently available on the Internet at www[dot]bluetooth[dot]org. WLAN is specified, for example, in the standards of the IEEE 802.11 family. Another example of a wireless communication technology is a trans-regional radio network technology, for example a mobile radio technology, for example the Global System for Mobile Communications (GSM) and/or Universal Mobile Telecommunications System (UMTS) and/or Long Term Evolution (LTE). The GSM, UMTS and LTE specifications are maintained and developed by the 3rd Generation Partnership Project (3GPP) and are currently available on the Internet, inter alia, at www[dot]3gpp[dot]com. In some exemplary embodiments of the invention, a wireless communication technology is also intended to be understood as meaning a broadcast technology, for example DAB (Digital Audio Broadcasting) and/or DMB (Digital Multimedia Broadcasting). The DAB standard is available online from the European Telecommunications Standards Institute (ETSI) under the code EN 300 401, for example.

One example of a wireless communication interface is a wireless network adapter. For example, a wireless communication interface comprises, in addition to an antenna, at least one transmitter circuit and one receiver circuit or a transceiver circuit.

The components 10 to 14 of the control apparatus 1 are communicatively and/or operatively connected to one another, for example, via one or more bus systems (for example one or more serial and/or parallel bus connections).

It goes without saying that, in addition to the components 10 to 14, the control apparatus 1 may comprise further components (for example a user interface and/or a further wired or wireless communication interface).

Figure 2:
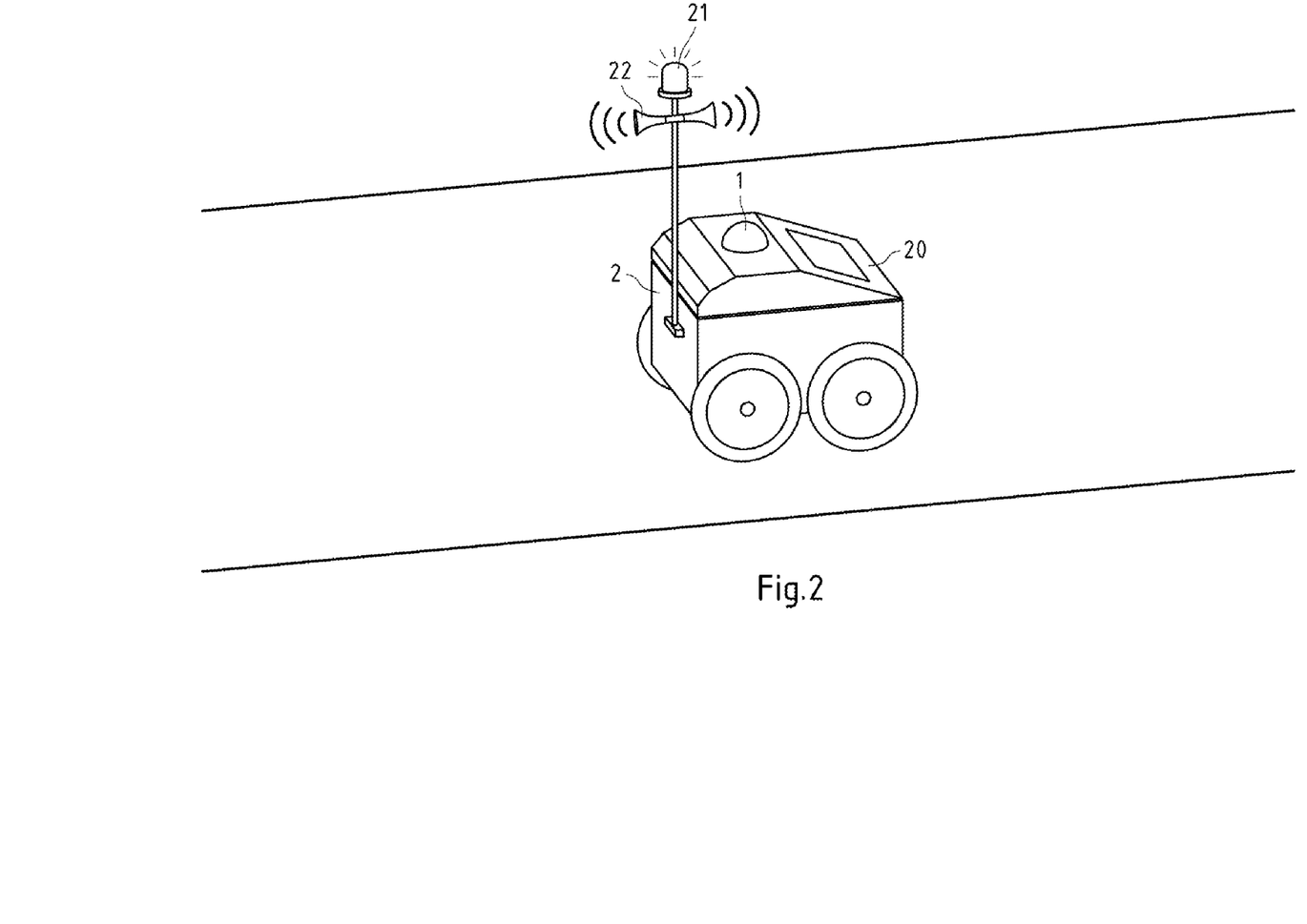
FIG. 2 shows a schematic illustration of an exemplary embodiment of an unmanned vehicle according to the invention.

FIG. 2 illustrates the control apparatus 1 disclosed in connection with FIG. 1 as part of an unmanned vehicle 2 according to the invention, for example. The unmanned vehicle 2 is a land vehicle and has a receiving compartment 20 which is closed with a door. The unmanned vehicle 2 can transport a shipment in the receiving compartment 20. For example, the unmanned vehicle 2 is a transport drone. For example, the unmanned vehicle is configured to deliver a shipment in an at least partially autonomous manner. The control apparatus 1 is configured, for example, to control such an at least partially autonomous delivery of a shipment by the unmanned vehicle 2.

The unmanned vehicle 2 in FIG. 2 further has, by way of example, a flashing light 21 and a siren 22 which are used to perform signal-based averting measures. The flashing light 21 is configured, for example, to output an optical flashing signal, and the siren 22 is configured, for example, to output an acoustic siren signal. The control apparatus 1 is configured, for example, to control the flashing light 21 and the siren 22.

It goes without saying that the unmanned vehicle 2 may alternatively or additionally have further means for performing averting measures. For example, the unmanned vehicle may have an electrical voltage generator which is configured to generate electrical voltage pulses. Furthermore, the voltage generator is connected to a metal surface or a metal part of the surface of the unmanned vehicle 2 in such a manner that electrical voltage pulses generated by the voltage generator can be transmitted from the metal surface or the metal part of the surface of the unmanned vehicle 2. Such a voltage generator is used, for example, to perform an averting measure which acts upon contact with the unmanned vehicle 2 or a part of the unmanned vehicle 2.

Figure 3:
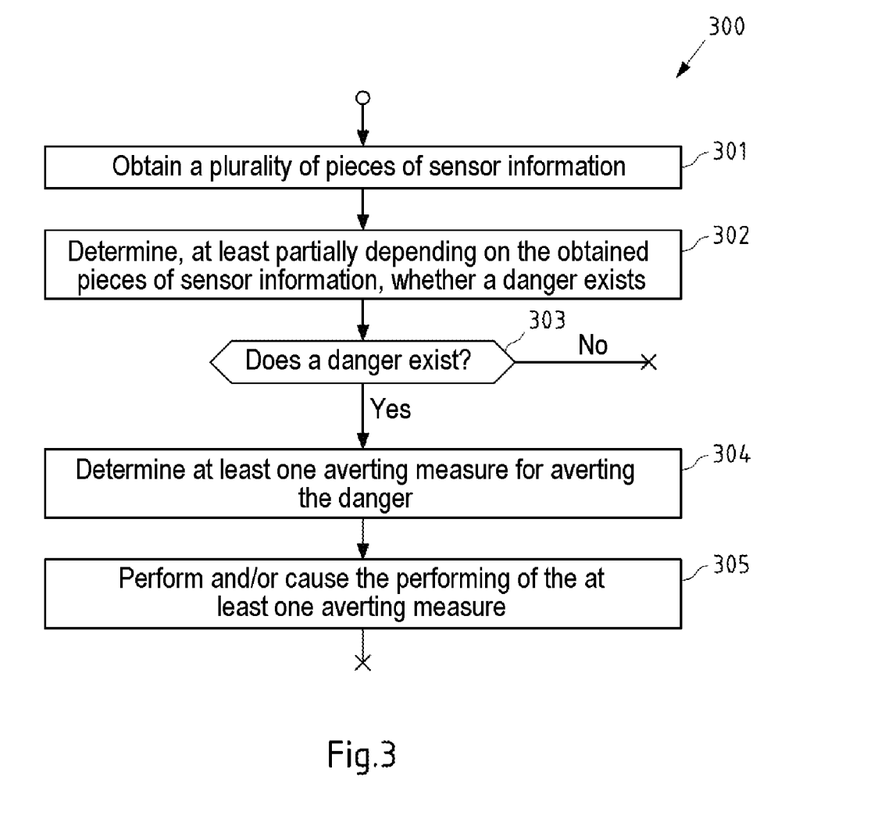
FIG. 3 shows a flowchart of an exemplary embodiment of a method according to the invention.

FIG. 3 shows a flowchart having steps of an exemplary embodiment of a method according to the invention. It is assumed by way of example below that steps 301 to 305 of the flowchart 300 are performed by the control apparatus 1 which is part of the unmanned vehicle 2 in FIG. 2.

In a step 301, a plurality of pieces of sensor information are obtained at the control apparatus 1. For example, the pieces of sensor information represent environment properties captured by the sensors 13 at the position of the unmanned vehicle 2.

In a step 302, it is determined, at least partially depending on the pieces of sensor information obtained in step 301, whether a danger exists.

As disclosed above, a danger is intended to be understood as meaning, for example, that there is a particular probability (for example more than 50%, preferably more than 75%, particularly preferably more than 90%) of damage (for example functional destruction and/or functional impairment) and/or unauthorized use (for example theft) of the unmanned vehicle 2 and/or of a shipment transported by the unmanned vehicle 2.

For example, the determining in step 302 can be carried out according to one or more predetermined rules. For example, corresponding pieces of control information which represent the predetermined rules are stored in memory 11 of the control apparatus.

If particular pieces of sensor information are obtained, the predetermined rules may predetermine that a danger exists, for example. The rules may further predetermine what type of danger it is if it is determined that a danger exists. For example, the rules may predetermine that, if a door opening sensor indicates that the door of the receiving compartment 20 has been opened without the control apparatus 1 being at the recipient address (for example captured by a position sensor) and/or a door opening authorization code previously having been obtained at the control apparatus 1 (for example by means of an input on a user interface of the control apparatus 1), a danger exists and that the type of danger is possible theft.

Alternatively or additionally, the determining in step 302 can also be carried out according to a pattern recognition algorithm and/or according to a machine learning algorithm, as disclosed above.

If it is determined that a danger exists, the flowchart is continued with a step 304. Otherwise, the flowchart is terminated in a step 303, for example, or is restarted with step 301.

In step 304, at least one averting measure for averting the danger is determined. For example, the at least one averting measure for averting the danger will be determined in step 304 in such a manner that it reduces the probability of damage and/or unauthorized use of the unmanned vehicle 2 and/or of a shipment transported by the unmanned vehicle 2.

For example, the determining of the at least one averting measure for averting the danger is carried out by selecting the at least one averting measure for averting the danger from a plurality of averting measures. The plurality of averting measures are, for example, all averting measures which are performable by the unmanned vehicle 2 and/or means of the unmanned vehicle 2 and/or all averting measures in a particular group of averting measures which are performable by the unmanned vehicle 2 and/or means of the unmanned vehicle 2.

The unmanned vehicle 2 has, for example, a flashing light 21 and a siren 22 for performing signal-based averting measures. As disclosed above, the unmanned vehicle 2 may alternatively or additionally have further means for performing averting measures.

The determining of the at least one averting measure is carried out in step 304 according to one or more predetermined rules, for example. The predetermined rules may predetermine, for example, which averting measure for which type of danger is intended to be determined and/or selected for the purpose of averting the danger. The type of danger is at least partially obtained, for example, as the result of determining in step 302 whether a danger exists and/or is determined if it is determined in step 302 that a danger exists.

For example, the rules further predetermine a sequence in which the averting measures are intended to be selected. For example, the sequence provides for only lenient averting measures (for example averting measures from the group of signal-based and/or movement-based averting measures) to be intended to be selected if it is determined for the first time that a danger exists. If it is determined that the danger still exists after these lenient averting measures have been performed, less lenient averting measures (for example averting measures from the group of averting measures which act upon contact with and/or at a distance from the unmanned vehicle or a part of the unmanned vehicle) are intended to be selected, for example.

It goes without saying that the at least one averting measure for averting the danger can be alternatively or additionally selected from the plurality of averting measures according to a pattern recognition algorithm and/or according to a machine learning algorithm. Within the scope of pattern recognition, each averting measure of the plurality of averting measures can be weighted on the basis of its suitability (for example effectiveness) for averting the danger, for example. For example, the weighting corresponds to an expected effectiveness and/or the probability with which the respective averting measure reduces the probability of damage and/or unauthorized use of the unmanned vehicle and/or of a shipment transported by the unmanned vehicle. Furthermore, a proportionality consideration (for example personal damage, social damage, material damage) and/or possible collateral damage can also be taken into account in the weighting. For example, of two averting measures which both equally reduce the probability of damage and/or unauthorized use of the unmanned vehicle 2 and/or of a shipment transported by the unmanned vehicle 2, that averting measure which probably causes less collateral damage can be given a higher weighting. For example, at least that averting measure which has the highest weighting is selected for the purpose of averting the danger.

It goes without saying that a plurality or all of the averting measures of the plurality of averting measures can also be determined and/or selected in step 304. For example, it may be predetermined that all averting measures or all averting measures with a particular minimum weighting are selected and/or determined.

If it has been determined in step 302 that a danger exists and the type of danger is possible theft, all signal-based averting measures which are performable by the unmanned vehicle 2 and/or means of the unmanned vehicle 2 can be determined and/or selected in step 304, for example.

The at least one averting measure determined in step 304 is performed and/or the performing of this averting measure is caused in step 305. It goes without saying that a plurality or all of the averting measures may also be performed and/or the performing of these averting measures may be caused in step 305 if a plurality of averting measures for averting the danger were determined in step 305.

The causing of an averting measure is intended to be understood as meaning, for example, that the control apparatus 1 prompts the unmanned vehicle 2 and/or means of the unmanned vehicle 2 to perform this averting measure. For example, the control apparatus 1 can accordingly control the unmanned vehicle 2 and/or means of the unmanned vehicle 2.

For example, the control apparatus 1, in step 305, can control the flashing light 21 to output an (optical) flashing signal and can control the siren 22 to output an (acoustic) siren signal if all signal-based averting measures which are performable by the unmanned vehicle 2 and/or means of the unmanned vehicle 2 are determined and/or selected in step 304.

In an optional further step, further pieces of sensor information may be obtained and it is possible to determine, at least partially depending on these further pieces of sensor information, whether the dangers still exists. If it is revealed that the danger no longer exists, stopping of the averting measures performed and/or caused in step 305 is caused, for example. Otherwise, steps 304 to 305, for example, are repeated in order to be able to possibly cause further averting measures (for example less lenient averting measures).

Provision may further be made for pieces of documentation information for documenting the danger and/or the averting of the danger to be stored in memory 11 of the control apparatus 1. The pieces of documentation information contain, for example, pieces of sensor information obtained from the sensors 13.

Figure 4:
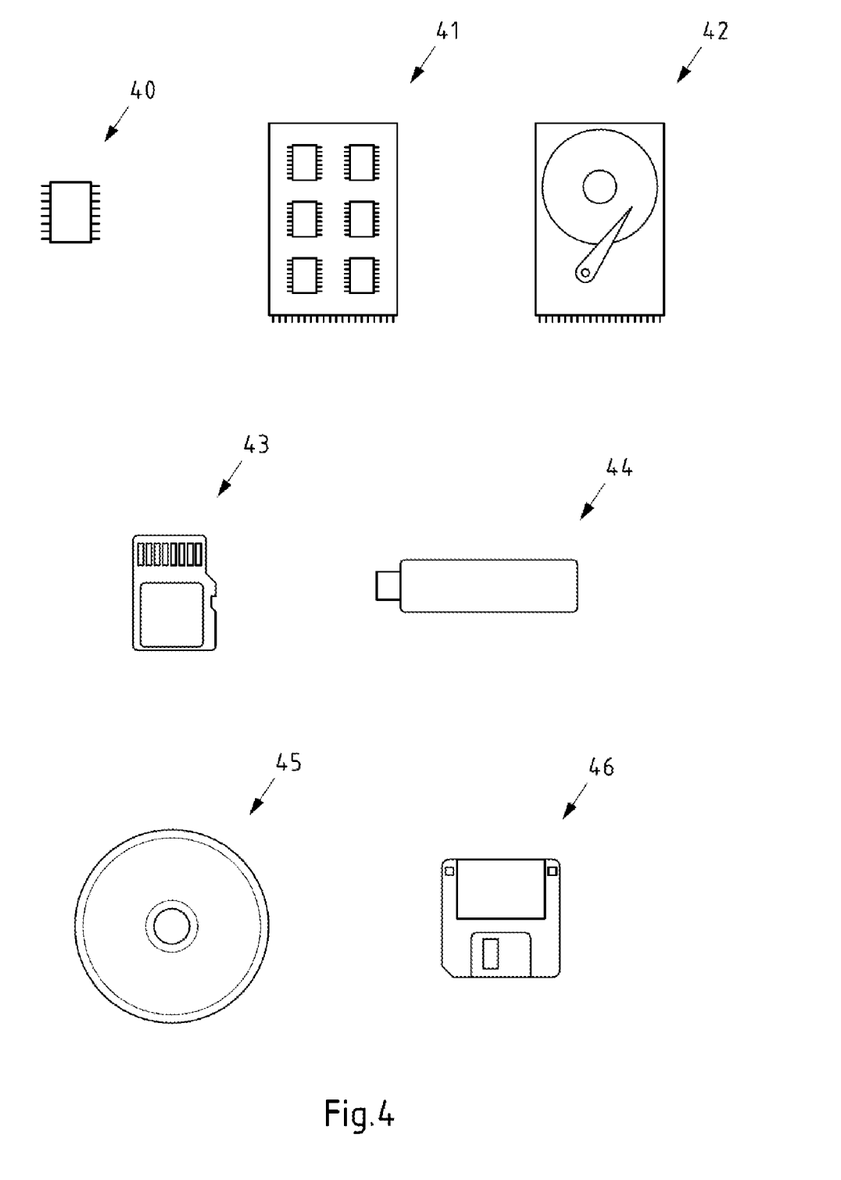
FIG. 4 shows exemplary embodiments of storage media.

FIG. 4 finally shows exemplary embodiments of storage media on which an exemplary embodiment of a computer program according to the invention can be stored. The storage medium may be, for example, a magnetic, electrical, optical and/or other storage medium. The storage medium may be, for example, part of a processor (for example the processor 10 in FIG. 1), for example a (non-volatile or volatile) program memory of the processor or a part thereof (for example memory 11 in FIG. 1). Exemplary embodiments of a storage medium are a flash memory 40, an SSD hard disk 41, a magnetic hard disk 42, a memory card 43, a memory stick 44 (for example a USB stick), a CD-ROM or DVD 45 or a floppy disk 46.

All references, including publications, patent applications, and patents cited herein are hereby incorporated by reference to the same extent as if each reference were individually and specifically indicated to be incorporated by reference and were set forth in its entirety herein.

The exemplary embodiments of the present invention described in this specification are also intended to be understood as having been disclosed in all combinations with one another. In particular, the description of a feature included in an embodiment—unless explicitly stated to the contrary—is also not intended to be understood in the present case as meaning that the feature is indispensable or essential to the function of the exemplary embodiment. The sequence of the method steps described in this specification in the individual flowcharts is not compulsory and alternative sequences of the method steps are conceivable, unless indicated otherwise. The method steps can be implemented in various ways; an implementation in software (by means of program instructions), hardware or a combination of both is therefore conceivable for implementing the method steps.

Terms used in the patent claims such as "comprise", "have", "contain", "include" and the like do not exclude further elements or steps. The wording "at least partially" includes both the case of "partially" and the case of "completely". The wording "and/or" is intended to be understood as meaning the fact that both the alternative and the combination are intended to be disclosed, that is to say "A and/or B" means "(A) or (B) or (A and B)". In the context of this specification, a plurality of units, persons or the like means several units, persons or the like. The use of the indefinite article does not exclude a plurality. An individual device may perform the functions of a plurality of units or devices mentioned in the patent claims. Reference symbols stated in the patent claims should not be considered as restrictions of the means and steps used.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method for averting a danger, wherein the method is performed by a control apparatus for an unmanned vehicle, and wherein the method comprises:
   obtaining a plurality of pieces of sensor information;
   determining, at least partially depending on the obtained pieces of sensor information, whether a danger exists;
   determining, if it is determined that a danger exists, at least one averting measure for averting the danger, wherein the at least one averting measure belongs to a group of averting measures which fix the unmanned vehicle to the environment or to an object in the environment,
   wherein the at least one averting measure which fixes the unmanned vehicle comprises the following action: triggering a fixing mechanism, and wherein, for the fixing mechanism, means are configured to anchor the unmanned vehicle or a part of the unmanned vehicle in the ground and/or to chain the unmanned vehicle or a part of the unmanned vehicle to an environment object, wherein the means configured to chain the unmanned vehicle or a part of the unmanned vehicle to the environment object comprise at least one of a screwing device, an arresting hook, an adhesive bonding device, or a type of automated shackle lock;
   performing or causing the performing of the at least one averting measure.

2. The method according to claim 1, wherein the determining of the at least one averting measure for averting the danger is carried out at least partially depending on the type of danger.

3. The method according to claim 1, wherein the determining of the at least one averting measure for averting the danger is carried out by selecting the at least one averting measure for averting the danger from a plurality of averting measures.

4. The method according to claim 3, wherein more than one averting measure of the plurality of averting measures is selected, and wherein at least one averting measure of the plurality of averting measures belongs to one of the following groups of averting measures:
signal-based averting measures,
movement-based averting measures,
averting measures which act upon contact with the unmanned vehicle or a part of the unmanned vehicle, or
averting measures which act at a distance from the unmanned vehicle or a part of the unmanned vehicle.

5. The method according to claim 4, wherein a signal-based averting measure comprises the following action:
outputting a signal, in particular an optical or acoustic or olfactory signal.

6. The method according to claim 4, wherein a movement-based averting measure comprises one or more of the following actions:
changing the movement speed of the unmanned vehicle, or
changing the movement direction of the unmanned vehicle.

7. The method according to claim 4, wherein an averting measure which acts upon contact with the unmanned vehicle or a part of the unmanned vehicle comprises one or more of the following actions:
changing the surface or a part of the surface of the unmanned vehicle,
applying an electrical voltage to the surface or a part of the surface of the unmanned vehicle, or
wetting the surface or a part of the surface of the unmanned vehicle with a liquid.

8. The method according to claim 4, wherein an averting measure which acts at a distance from the unmanned vehicle or a part of the unmanned vehicle comprises one or more of the following actions:
casting a net,
triggering a distance electroshock weapon,
triggering a sound or radiation cannon, or
spraying a liquid or a gas.

9. A control apparatus for an unmanned vehicle, comprising at least one processor and at least one memory containing program instructions, wherein the at least one memory and the program instructions are configured, together with the at least one processor, to cause the apparatus to perform:
obtaining a plurality of pieces of sensor information;
determining, at least partially depending on the obtained pieces of sensor information, whether a danger exists;
determining, if it is determined that a danger exists, at least one averting measure for averting the danger, wherein the at least one averting measure belongs to a group of averting measures which fix the unmanned vehicle to the environment or to an object in the environment, wherein the at least one averting measure which fixes the unmanned vehicle comprises the following action: triggering a fixing mechanism, and wherein, for the fixing mechanism, means are configured to anchor the unmanned vehicle or a part of the unmanned vehicle in the ground and/or to chain the unmanned vehicle or a part of the unmanned vehicle to an environment object,
wherein the means configured to chain the unmanned vehicle or a part of the unmanned vehicle to the environment object comprise at least one of a screwing device, an arresting hook, an adhesive bonding device, and a type of automated shackle lock;
performing or causing the performing of the at least one averting measure.

10. The control apparatus according to claim 9, wherein the pieces of sensor information originate from one or more of the following sensors: a temperature sensor, a pressure sensor, a brightness sensor, a motion sensor, an acoustic sensor, an ultrasonic sensor, an optical sensor, an infrared sensor, a light sensor, an image sensor, a video sensor, a chemical sensor, a glass breakage sensor, a motion sensor, a radio sensor, a position sensor, a door or window opening sensor or an acceleration sensor.

11. The control apparatus according to claim 9, wherein the determining whether a danger exists is carried out according to one or more predetermined rules or according to a pattern recognition algorithm or according to a machine learning algorithm or a combination thereof.

12. The control apparatus according to claim 9, wherein the determining of the at least one averting measure for averting the danger is carried out at least partially depending on the type of danger.

13. The control apparatus according to claim 9, wherein the determining of the at least one averting measure for averting the danger is carried out by selecting the at least one averting measure for averting the danger from a plurality of averting measures.

14. The control apparatus according to claim 13, wherein more than one averting measure of the plurality of averting measures is selected, and wherein at least one averting measure of the plurality of averting measures belongs to one of the following groups of averting measures:
signal-based averting measures,
movement-based averting measures,
averting measures which act upon contact with the unmanned vehicle or a part of the unmanned vehicle, or
averting measures which act at a distance from the unmanned vehicle or a part of the unmanned vehicle.

15. The control apparatus according to claim 14, wherein a signal-based averting measure comprises the following action:
outputting a signal, in particular an optical or acoustic or olfactory signal.

16. The control apparatus according to claim 14, wherein a movement-based averting measure comprises one or more of the following actions:
changing the movement speed of the unmanned vehicle, or
changing the movement direction of the unmanned vehicle.

17. The control apparatus according to claim 14, wherein an averting measure which acts upon contact with the unmanned vehicle or a part of the unmanned vehicle comprises one or more of the following actions:
changing the surface or a part of the surface of the unmanned vehicle,
applying an electrical voltage to the surface or a part of the surface of the unmanned vehicle, or
wetting the surface or a part of the surface of the unmanned vehicle with a liquid.

18. The control apparatus according to claim 14, wherein an averting measure which acts at a distance from the unmanned vehicle or a part of the unmanned vehicle comprises one or more of the following actions:
casting a net,
triggering a distance electroshock weapon,
triggering a sound or radiation cannon, or
spraying a liquid or a gas.

19. The control apparatus according to claim 9, wherein the at least one memory and the program instructions are further configured, together with the at least one processor, to cause the apparatus to perform:

storing or prompting the storing of pieces of documentation information for documenting the danger or the averting of the danger.

20. The control apparatus according to claim 9, wherein the at least one memory and the program instructions are further configured, together with the at least one processor, to cause the apparatus to perform:

obtaining further pieces of sensor information; and determining, at least partially depending on the obtained further pieces of sensor information, whether the danger still exists.

21. A non-transitory computer readable storage medium including a computer program comprising program instructions which are configured, when executed by at least one processor, to cause an apparatus to perform:

obtaining a plurality of pieces of sensor information;

determining, at least partially depending on the obtained pieces of sensor information, whether a danger exists;

determining, if it is determined that a danger exists, at least one averting measure for averting the danger, wherein the at least one averting measure belongs to a group of averting measures which fix the unmanned vehicle to the environment or to an object in the environment, wherein the at least one averting measure which fixes the unmanned vehicle comprises the following action: triggering a fixing mechanism, and wherein, for the fixing mechanism, means are configured to anchor the unmanned vehicle or a part of the unmanned vehicle in the ground and/or to chain the unmanned vehicle or a part of the unmanned vehicle to an environment object, wherein the means configured to chain the unmanned vehicle or a part of the unmanned vehicle to the environment object comprise at least one of a screwing device, an arresting hook, an adhesive bonding device, or a type of automated shackle lock;

performing or causing the performing of the at least one averting measure.

* * * * *